(12) United States Patent
Lin

(10) Patent No.: US 8,595,906 B1
(45) Date of Patent: Dec. 3, 2013

(54) SAFETY HOOK

(76) Inventor: Pei Chuan Lin, Taichung (TW)

( * ) Notice: Subject to any disclaimer, the term of this patent is extended or adjusted under 35 U.S.C. 154(b) by 14 days.

(21) Appl. No.: 13/483,103

(22) Filed: May 30, 2012

(51) Int. Cl.
*B66C 1/36* (2006.01)
*F16B 45/02* (2006.01)

(52) U.S. Cl.
USPC ............... 24/600.2; 294/82.21; 294/82.23; 294/82.34

(58) Field of Classification Search
None
See application file for complete search history.

(56) References Cited

U.S. PATENT DOCUMENTS

| | | | | |
|---|---|---|---|---|
| 348,791 A * | 9/1886 | Smith | .................... | 294/82.21 |
| 1,002,852 A * | 9/1911 | Lane | .................... | 24/600.2 |
| 1,088,614 A * | 2/1914 | Olstad | .................... | 24/600.2 |
| 1,278,494 A * | 9/1918 | Nesbit | .................... | 294/82.21 |
| 1,376,258 A * | 4/1921 | Cox | .................... | 294/82.21 |
| 1,390,023 A * | 9/1921 | Coon | .................... | 294/82.21 |
| 1,411,549 A * | 4/1922 | Abbott | .................... | 294/82.21 |
| 1,508,705 A * | 9/1924 | Mahan | .................... | 294/82.21 |
| 1,956,786 A * | 5/1934 | Bemis | .................... | 294/82.21 |
| 2,657,446 A * | 11/1953 | Roberts | .................... | 294/82.21 |
| 3,436,795 A * | 4/1969 | Hill | .................... | 294/82.34 |
| 4,293,156 A * | 10/1981 | Chapalain | .................... | 294/82.21 |
| 4,320,561 A * | 3/1982 | Muller et al. | .................... | 294/82.21 |
| 4,416,480 A * | 11/1983 | Moody | .................... | 294/82.34 |
| 6,237,977 B1 * | 5/2001 | Johnson, Jr. | .................... | 294/82.34 |

* cited by examiner

*Primary Examiner* — Jack W. Lavinder
(74) *Attorney, Agent, or Firm* — Rosenberg, Klein & Lee

(57) ABSTRACT

A safety hook includes a hook body defining a front opening, a swivel ring coupled to a rear side of the hook body, a latch pivotally connected to the hook body and movable between a latched position and an unlatched position to close/open the front opening of the hook body, a spring member stopped between the hook body and the latch to support the latch in the latched position, and a safety locking member mounted in the latch and movable between a locking position to lock the latch in the latched position and an unlocking position for allowing the latch to be moved from the latched position to the unlatched position.

4 Claims, 5 Drawing Sheets

SAFETY HOOK

BACKGROUND OF THE INVENTION

1. Field of the Invention

The present invention relates to safety hooks and more particularly, to a safety hook with a safety locking member.

2. Description of the Prior Art

FIG. 1 illustrates a conventional swivel snap hook. According to this design, the swivel snap hook 80 comprises a hook body 81, and a latch 82 slidably coupled to the hook body 81. The hook body 81 has its one end terminating in a hooked portion 85 for hooking on an object, for example, a retaining ring 71 at a pet collar or pet harness 70, and its other end forming a neck 86 for the coupling of a swivel ring 83 that is connected to a fabric belt 90 or similar object, such as rope or chain. Further, a compression spring 84 is stopped between the hook body 81 and the latch 82 to support the latch 82 in the latched position where the hooked portion 85 and the latch 82 define an enclosed opening 87 to hold the retaining ring 71 in place.

FIG. 2 illustrates another structure of swivel snap hook according to the prior art. According to this design, the swivel snap hook 80a is substantially similar to the swivel snap hook 80 shown in FIG. 1, comprising a hook body 81a having a hooked portion 85a and a neck 86a, a latch 82a for closing the hooked portion 85a, a swivel ring 83a rotatably coupled to the neck 86a, and a spring member 84a set between the hook body 81a and the latch 82a. The difference between the swivel snap hook 80a shown in FIG. 2 and the swivel snap hook 80 shown in FIG. 1 is that the latch 82a of the swivel snap hook 80a shown in FIG. 2 is pivotally coupled to the associating hook body 81a, and the spring member 84a of the swivel snap hook 80a shown in FIG. 2 is a torsion spring that normally holds the latch 82a in the latched position where the hooked portion 85a and the latch 82a define an enclosed opening 87a to secure a retaining ring 71 of a pet collar or pet harness 70. Except the stated differences, the two swivel snap hooks 80 and 80a are substantially similar in structure and function.

Further, the latches 82 and 82a of the two swivel snap hooks 80 and 80a commonly have an outwardly protruded finger rod 88 or 88a, facilitating operation. However, the outwardly protruded finger rod 88 or 88a may be driven accidentally by the retaining ring 71 or an external force to unlock the latch 82 or 82a, causing the retaining ring 71 to fall out of the hooked portion 85 or 85a, or leading to a serious accident. For example, the chained or tied dog may run out suddenly, due to accidental disconnection of the retaining ring 71 from the swivel snap hook 80 or 80a, leading to a great risk of being hit by a car or biting a passer-by.

SUMMARY OF THE INVENTION

The objective of the present invention is to provide a safety hook, which can lock the latch in the latched position, avoiding false operation and assuring a high level of safety.

To achieve this and other objects of the present invention, a safety hook comprises a hook body defining a front opening, a swivel ring coupled to a rear side of the hook body, a latch pivotally connected to the hook body and movable between a latched position and an unlatched position to close/open the front opening of the hook body, a spring member stopped between the hook body and the latch to support the latch in the latched position, and a safety locking member mounted in the latch and movable between a locking position and an unlocking position. When the safety locking member is moved to the locking position, the latch is locked in the latched position. When the safety locking member is moved to the unlocking position, the latch is released from the constraint and is operable to move the latch arm thereof out of the front opening of the hook body.

When compared to the prior art designs, the safety hook of the present invention provides a safety locking member for locking the latch in the latched position, avoiding a false operation of the latch and assuring a high level of safety.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
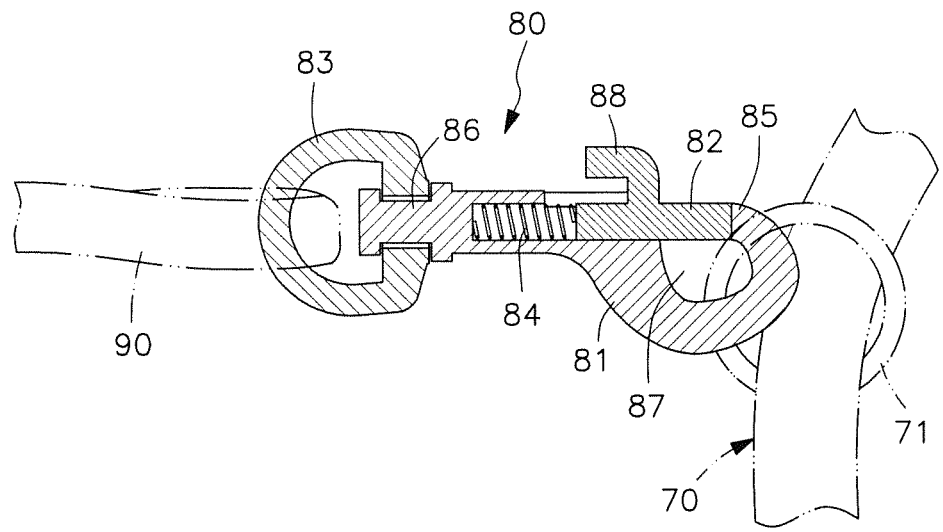
FIG. 1 is a sectional view of a swivel snap hook according to the prior art.
Figure 2:
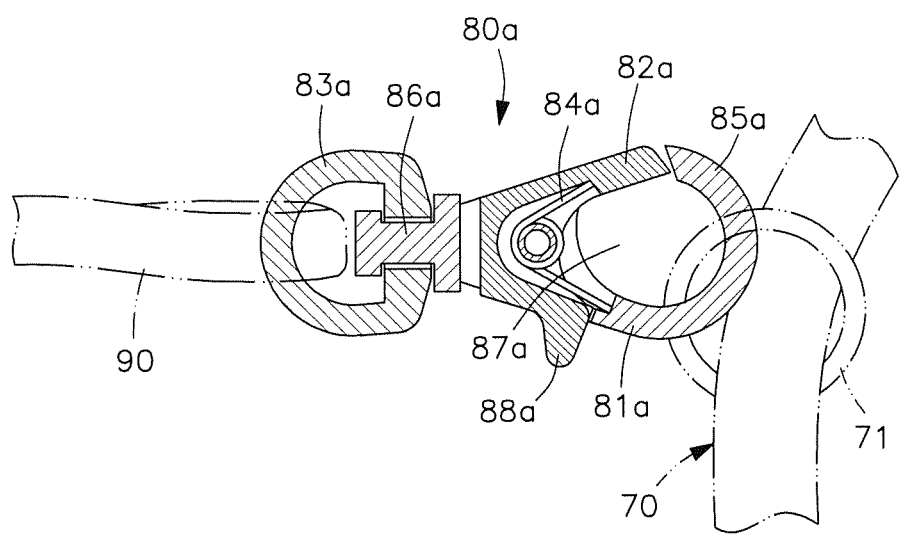
FIG. 2 is a sectional view of another structure of swivel snap hook according to the prior art.
Figure 3:
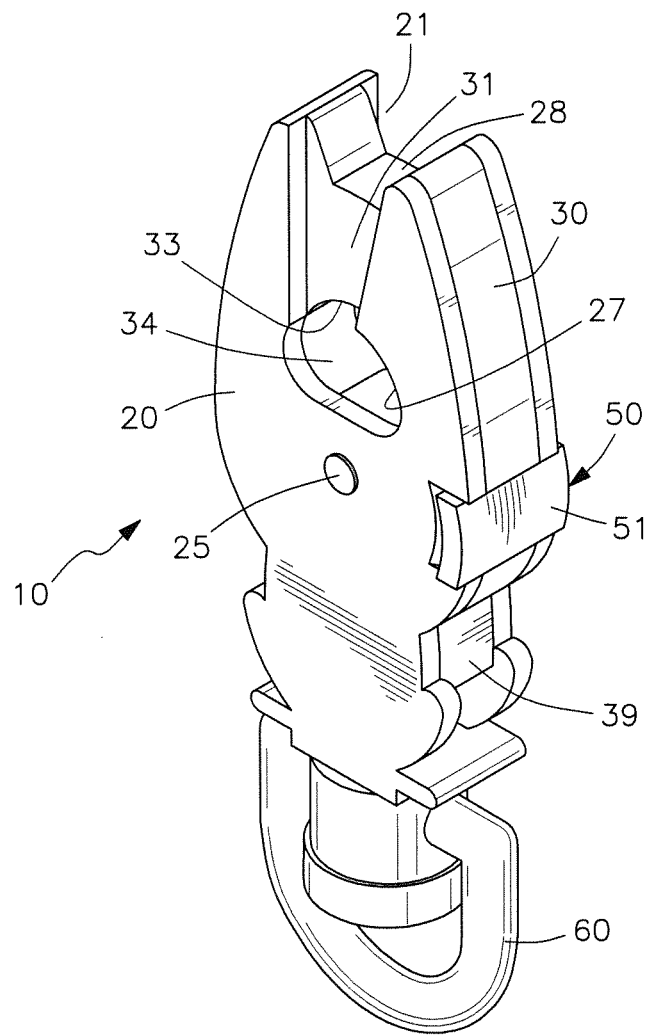
FIG. 3 is a perspective view of a latched status of a safety hook in accordance with the present invention.
Figure 4:
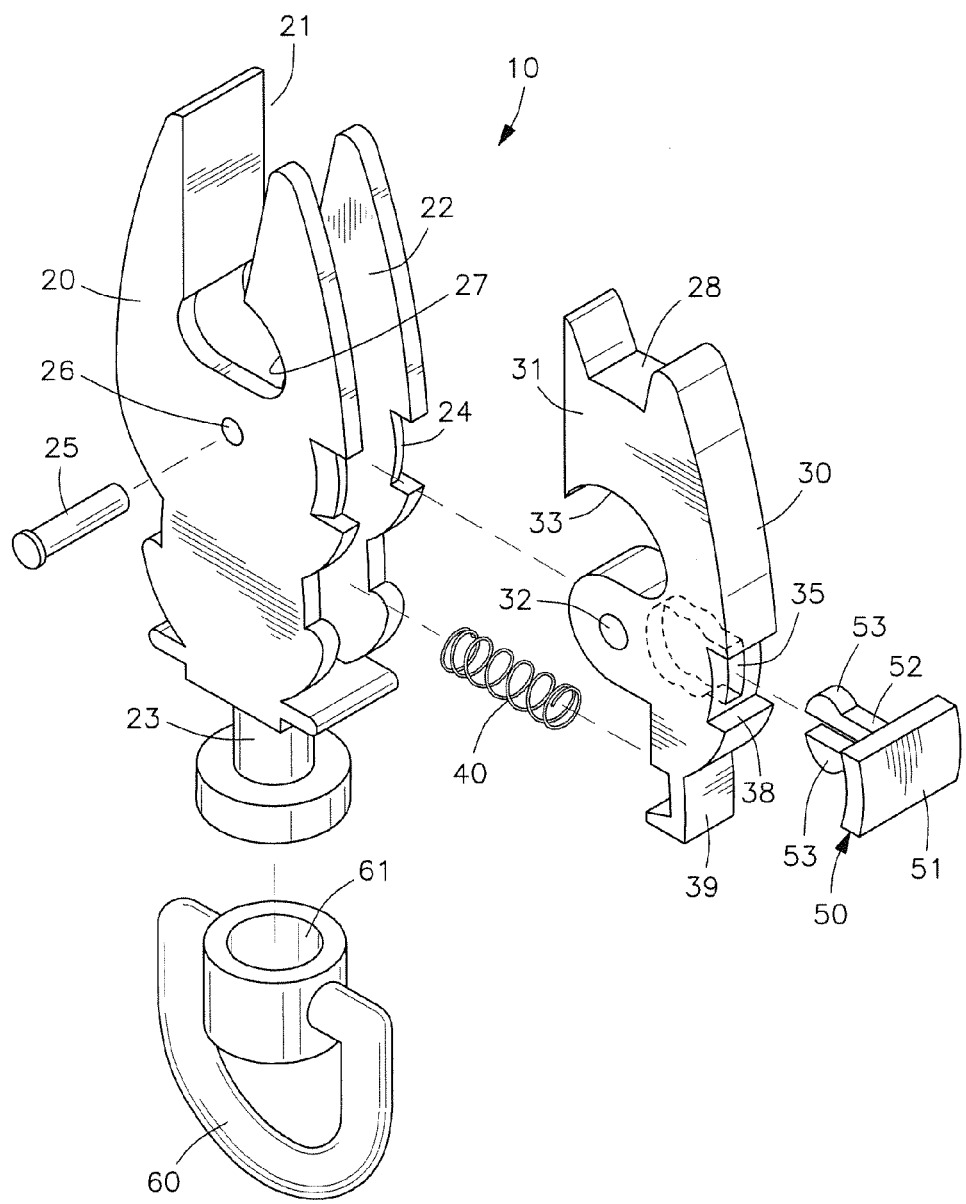
FIG. 4 is an exploded view of the present invention.
Figure 5:
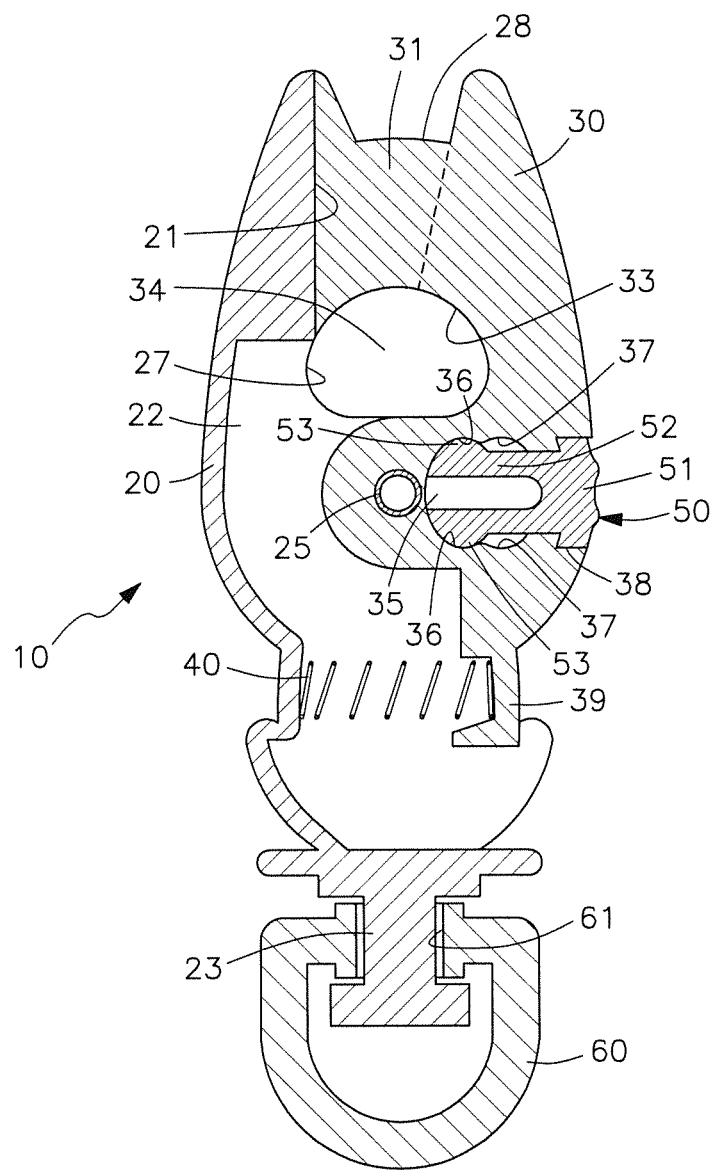
FIG. 5 is a sectional view of the present invention, illustrating the latch in the latched position.

A perspective view, an exploded view and a sectional view of the present invention safety hook 10 are shown in FIGS. 3, 4 and 5. The safety hook 10 comprises a hook body 20, a latch 30, a spring member 40, a safety locking member 50, and a swivel ring 60.

The hook body 20 comprises a front opening 21 defined in a front end thereof for the access of a retaining ring of a first external object (not shown), a latch chamber 22 defined therein in communication with the front opening 21 for accommodating the latch 30, a neck 23 disposed at a rear end thereof opposite to the front opening 21 for supporting the swivel ring 60, a notch 24 located on one lateral side thereof of which the purpose will be described latter, a mounting through hole 26 disposed at a rear side relative to the front opening 21, and a pivot member, for example, rivet 25 inserted through the mounting through hole 26 and riveted thereto to pivotally connect the latch 30 to the hook body 20.

The latch 30 is inserted into the latch chamber 22 of the hook body 20, comprising a pivot hole 32 coaxially disposed in the mounting through hole 26 for the passing of the rivet 25 for allowing the latch 30 to be turned about the rivet 25, a latch arm 31 insertable into an upper part of the front opening 21 of the hook body 20 and adapted for closing/opening the front opening 21 of the hook body 20 when the latch 30 is turned inwards or outwards relative to the hook body 20, a lateral opening 33 disposed at a bottom side of the latch arm 31, a sliding groove 35, a pair of locking-control grooves 36 symmetrically bilaterally disposed in the sliding groove 35, a pair of unlocking-control grooves 37 symmetrically bilaterally disposed in the sliding groove 35 near the locking-control grooves 36 for holding the safety locking member 50 in a locking position and an unlocking position, a recess 38 disposed outside the sliding groove 35 and fitting the notch 24 of the hook body 20 for receiving an operating handle 51 of the safety locking member 50, and a tail piece 39 disposed at a rear side thereof. Further, the sliding groove 35 can be formed inside the latch 30, as illustrated, or alternatively, formed on the outside of the latch 30. Further, the lateral opening 33 of the latch 30 defines with a lower part 27 of the front opening 21 of the hook body 20 an enclosed opening 34 to secure the retaining ring of the aforesaid first external object (not shown).

The spring member 40 is adapted for returning the latch 30 automatically, having its one end stopped against the tail piece 39 of the latch 30 and its other end stopped against an inside wall of the latch chamber 22 of the hook body 20. According to the present preferred embodiment, the spring member 40 is a compression spring that exerts a force when compressed. However, other equivalent elastic means may be used to substitute for a compression spring.

The safety locking member 50 is movable in the sliding groove 35 of the latch 30 for locking or unlocking the latch 30. The safety locking member 50 comprises an operating handle 51, and a split bolt 52. The operating handle 51 is operable by the fingers of a person to move the safety locking member 50, facilitating operation of the latch 30. The split bolt 52 is a flat split bolt extended from an inner side of the operating handle 51 and inserted into the sliding groove 35. Further, the split bolt 52 is equally split into two symmetrical halves, having an outwardly protruded retaining block 53 located on the distal end of each of the two symmetrical halves thereof. Following movement of the safety locking member 50 in the sliding groove 35, the retaining blocks 53 can be selectively engaged into the locking-control grooves 36 or unlocking-control grooves 37, thus, the safety locking member 50 can be kept in the locking position or unlocking position, prohibiting or allowing operation of the latch 30. According to the present preferred embodiment, two retaining blocks 53, two locking-control grooves 36 and unlocking-control grooves 37 are provided. Alternatively, one single retaining block 53 can be provided to match with one single locking-control groove 36 and one single unlocking-control groove 37, achieving the same effects.

The swivel ring 60 comprises an axle hole 61 coupled to the neck 23 of the hook body 20. Thus, the swivel ring 60 is connected to the hook body 20 and can be turned round the neck 23. Further, the swivel ring 60 can be fastened to a second external object (not shown), for example, a fabric belt, rope or chain.

Referring to FIG. 5, when moving the safety locking member 50 inwards to force the retaining blocks 53 of the split bolt 52 into engagement with the locking-control grooves 36, the operating handle 51 is fitted into the notch 24 of the hook body 20 and the recess 38 of the latch 30, and therefore the latch 30 is held in the latched position and will not be unlatched accidentally, avoiding false operation and disconnection of the retaining ring of the aforesaid first external object.

Figure 6:
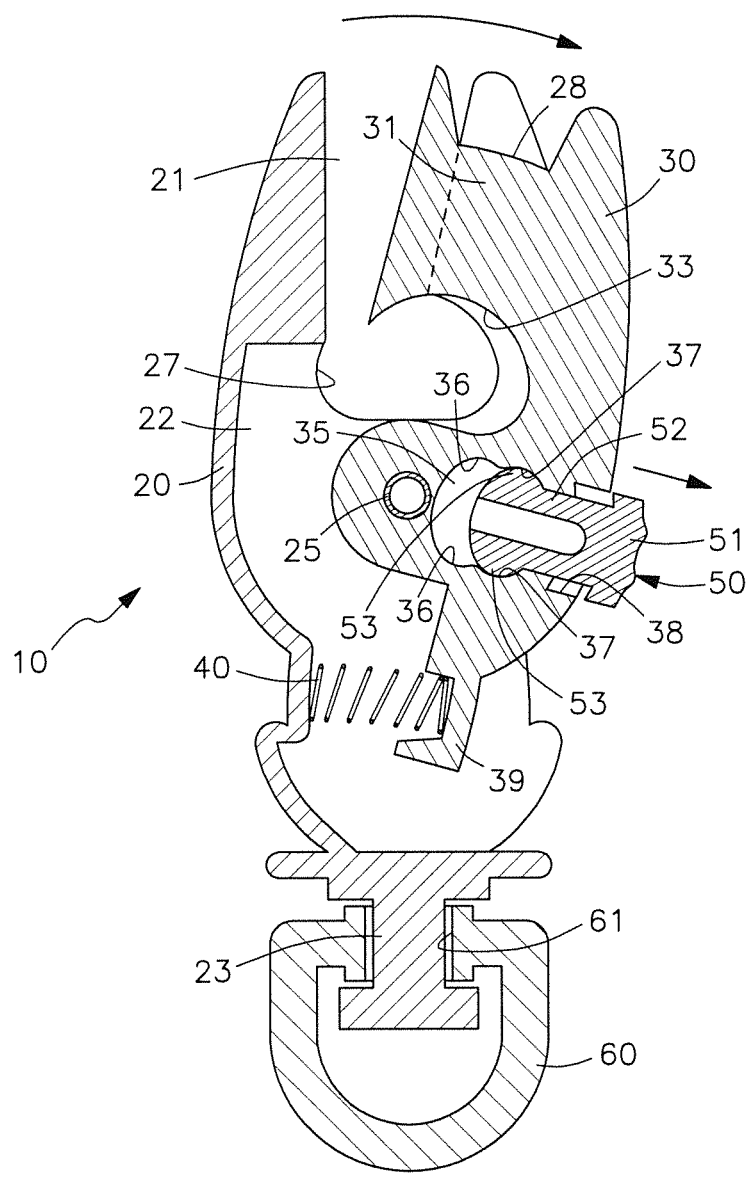
FIG. 6 is a sectional view of the present invention, illustrating the latch unlatched.

Referring to FIG. 6, when moving the safety locking member 50 outwards to disengage the retaining blocks 53 of the split bolt 52 from the locking-control grooves 36 and to force the retaining blocks 53 of the split bolt 52 into engagement with the unlocking-control grooves 37, the operating handle 51 is moved away from the notch 24 of the hook body 20 and the recess 38 of the latch 30, and therefore the latch 30 is unlocked. At this time, the user can operate the handle 51 or a finger notch 28 at the top side of the latch arm 31 to turn the latch 30 about the rivet 25 in direction away from the front opening 21 of the hook body 20, thereby opening the front opening 21 of the hook body 20 for allowing removal of the retaining ring of the first external object from the safety hook 10.

Although a particular embodiment of the invention has been described in detail for purposes of illustration, various modifications and enhancements may be made without departing from the scope of the invention. Accordingly, the invention is not to be limited except as by the appended claims.

What is claimed is:

1. A safety hook, comprising:
   a hook body comprising a front opening defined in a front end thereof, a latch chamber defined therein in communication with said front opening, and a notch located on one lateral side thereof;
   a latch inserted into said latch chamber and pivotally connected to said hook body, said latch comprising a latch arm insertable into an upper part of said front opening of said hook body, a sliding groove, at least one locking-control groove and at least one unlocking-control groove formed in said sliding groove, a lateral opening disposed at a bottom side of said latch arm and defining with a lower part of said front opening of said hook body an enclosed opening, and a recess disposed outside said sliding groove and fitting the notch of said hook body;
   a spring member stopped between said latch and said hook body and imparting a pressure to said latch to force said latch arm into the upper part of said front opening of said hook body; and
   a safety locking member comprising a split bolt movably inserted into said sliding groove of said latch for locking or unlocking the latch and an operating handle operable to move said split bolt in said sliding groove, said split bolt comprising at least one retaining block;
   wherein when moving said safety locking member inwards to force said at least one retaining block into engagement with said at least one locking-control groove, said handle is fitted into said notch of said hook body and said recess of said latch and said latch is locked in a latched position where said latch arm is inserted into the upper part of said front opening of said hook body; when moving said safety locking member outwards to disengage said at least one retaining block from said at least one locking-control groove and to force said at least one retaining block into engagement with said at least one unlocking-control groove, said handle is moved away from said notch of said hook body and said recess of said latch and said latch is unlocked and movable relative to said hook body in direction away from said front opening of said hook body.

2. The safety hook as claimed in claim 1, wherein said hook body further comprises a neck disposed at a rear end thereof opposite to said front opening, and a swivel ring rotatably coupled to said neck.

3. The safety hook as claimed in claim 1, wherein said sliding groove of said latch comprises a pair of oppositely disposed locking-control grooves and a pair of disposed unlocking-control grooves; said split bolt of said safety locking member is equally split into two symmetrical halves, having one said retaining block located on each of said two symmetrical halves.

4. The safety hook as claimed in claim 1, wherein said latch further comprises a finger notch located on a top side of said latch arm.

\* \* \* \* \*